(12) United States Patent
Li

(10) Patent No.: US 10,921,679 B2
(45) Date of Patent: Feb. 16, 2021

(54) PROJECTION DEVICE AND 3D PRINTER COMPRISING THE SAME

(71) Applicant: BOE Technology Group Co., Ltd., Beijing (CN)

(72) Inventor: Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 830 days.

(21) Appl. No.: 15/511,118

(22) PCT Filed: Apr. 14, 2016

(86) PCT No.: PCT/CN2016/079255
§ 371 (c)(1),
(2) Date: Mar. 14, 2017

(87) PCT Pub. No.: WO2016/184280
PCT Pub. Date: Nov. 24, 2016

(65) Prior Publication Data
US 2017/0277024 A1    Sep. 28, 2017

(30) Foreign Application Priority Data
May 15, 2015 (CN) .......................... 2015 1 0250265

(51) Int. Cl.
*G03B 21/00* (2006.01)
*B33Y 30/00* (2015.01)
(Continued)

(52) U.S. Cl.
CPC ........ *G02F 1/16762* (2019.01); *B29C 64/129* (2017.08); *B29C 64/20* (2017.08);
(Continued)

(58) Field of Classification Search
CPC ..... G03B 21/005; B29C 64/20; B29C 64/129; B29C 64/264; B29C 67/00; G02F 1/167;
(Continued)

(56) References Cited

U.S. PATENT DOCUMENTS 4,450,440 A * 5/1984 White .................. G01R 13/405
204/600
6,512,626 B1 * 1/2003 Schmidt .................. G02F 1/167
204/450
(Continued)

FOREIGN PATENT DOCUMENTS

CN    101118361 A    2/2008
CN    101506727 A    8/2009
(Continued)

OTHER PUBLICATIONS

International Search Report (English translation) and Written Opinion of International Application No. PCT/CN2016/079255, dated Jul. 19, 2016, 6 pages.
(Continued)

*Primary Examiner* — Stephen W Smoot
*Assistant Examiner* — Vicki B. Booker
(74) *Attorney, Agent, or Firm* — Westman, Champlin & Koehler, P.A.

(57) ABSTRACT

The present disclosure provides a projection device for a 3D printer, the projection device including a light source and a display panel for displaying an image to be printed, the image to be printed including a light transmission region and/or a light shielding region. The projection device is configured such that lights emitted from the light source pass through the light transmission region, and that the lights passing through the light transmission region from the light source are non-polarized lights. The present disclosure also provides a 3D printer.

15 Claims, 4 Drawing Sheets

(51) Int. Cl.

| | |
|---|---|
| *B29C 67/00* | (2017.01) |
| *G02F 1/167* | (2019.01) |
| *B29C 64/264* | (2017.01) |
| *B29C 64/129* | (2017.01) |
| *B29C 64/20* | (2017.01) |
| *G02F 1/155* | (2006.01) |
| *G02F 1/163* | (2006.01) |
| *G02F 1/1335* | (2006.01) |
| *G02F 1/1362* | (2006.01) |
| *G02F 1/1676* | (2019.01) |
| *G02F 1/1333* | (2006.01) |
| *G02F 1/16762* | (2019.01) |
| *G02F 1/16761* | (2019.01) |
| *G02F 1/16766* | (2019.01) |

(52) U.S. Cl.
CPC ............ *B29C 64/264* (2017.08); *B29C 67/00* (2013.01); *B33Y 30/00* (2014.12); *G02F 1/133512* (2013.01); *G02F 1/136213* (2013.01); *G02F 1/136286* (2013.01); *G02F 1/155* (2013.01); *G02F 1/163* (2013.01); *G02F 1/167* (2013.01); *G02F 1/16761* (2019.01); *G02F 1/16766* (2019.01); *G03B 21/005* (2013.01); *G02F 1/13624* (2013.01); *G02F 2001/133357* (2013.01); *G02F 2001/1635* (2013.01); *G02F 2201/121* (2013.01); *G02F 2201/123* (2013.01)

(58) Field of Classification Search
CPC ......... G02F 1/136286; G02F 1/136213; G02F 1/133512; G02F 1/163; G02F 1/155; G02F 1/1676; G02F 1/13624; G02F 2201/123; G02F 2201/121; G02F 2001/1635; G02F 2001/133357; G02F 1/16762; G02F 1/16761; G02F 1/16766; B33Y 30/00
See application file for complete search history.

(56) References Cited

U.S. PATENT DOCUMENTS

| | | | |
|---|---|---|---|
| 8,228,290 | B2 | 7/2012 | Verschueren |
| 2001/0030639 | A1* | 10/2001 | Goden .................... G02F 1/167 |
| | | | 345/107 |
| 2010/0090944 | A1* | 4/2010 | Fricke .................. G09G 3/3446 |
| | | | 345/107 |
| 2010/0328626 | A1 | 12/2010 | Miyazaki |
| 2012/0050840 | A1* | 3/2012 | Lim ........................ G02F 1/167 |
| | | | 359/296 |
| 2015/0268530 | A1 | 9/2015 | Xu et al. |
| 2015/0277176 | A1* | 10/2015 | Seo ..................... G02F 1/13394 |
| | | | 349/46 |

FOREIGN PATENT DOCUMENTS

| | | |
|---|---|---|
| CN | 103722745 A | 4/2014 |
| CN | 103969905 A | 8/2014 |
| CN | 203766034 U | 8/2014 |
| CN | 104122732 A | 10/2014 |
| CN | 104536162 A | 4/2015 |
| CN | 104786509 A | 7/2015 |

OTHER PUBLICATIONS

English translation of Box No. V of the Written Opinion for the International Searching Authority for International Application No. PCT/CN2016/079255, 2 pages.

First Office Action, including Search Report, for Chinese Patent Application No. 201510250265.1, dated Sep. 26, 2016, 16 pages.

Second Office Action for Chinese Patent Application No. 201510250265. 1, dated Apr. 12, 2017, 17 pages.

"Experimental Study on Nano-Doped Polymer Dispersed Liquid Crystal (PDLC) Optical Switch", Huanhuan Liang, p. 2 in the introduction section, Wanfang Data Enterprise Knowledge Service Platform, published on Oct. 13, 2010, 37 pages.

Fourth Office Action for Chinese Patent Application No. 201510250265. 1, dated Jan. 26, 2018, 10 pages.

\* cited by examiner

PROJECTION DEVICE AND 3D PRINTER COMPRISING THE SAME

CROSS-REFERENCE TO RELATED APPLICATION

This application is a Section 371 National Stage application of International Application No. PCT/CN2016/079255, filed on Apr. 14, 2016, which published as WO 2016/184280 A1 on Nov. 24, 2016, and claims priority to Chinese Patent Application No. 2015/10250265.1, filed on May 15, 2015, in the State Intellectual Property Office of China, the whole disclosures of which are incorporated herein by reference in their entirety.

TECHNICAL FIELD

The present disclosure relates to the field of 3D printers, and more particularly, to a projection device for a 3D printer and a 3D printer including the projection device.

DESCRIPTION OF THE RELATED ART 3D printing is a novel rapid prototyping manufacturing technology, and it is shown in FIG. 1 a conventional 3D printer. As shown in FIG. 1, the 3D printer comprises a light source 1, a liquid crystal screen 8, a transparent reservoir 3, and a lifting bar-pallet 5, in which transparent reservoir 3 a photopolymerizable material 4 is accommodated.

In the 3D printer, the projection device mainly comprises the liquid crystal screen 8, and an image to be printed can be displayed on the liquid crystal screen 8. The image to be printed is composed of a light transmission region and a light shielding region. When the image to be printed is displayed on the liquid crystal screen 8, lights emitted from the light source 1 pass through the light transmission region to irradiate the photopolymerizable material 4 between a bottom plate of the lifting bar-pallet 5 and a bottom wall of the transparent reservoir 3 and cure the same, such that a pattern conforming to the image displayed on the projection device is formed on the bottom plate of the lifting bar-pallet 5. As a result, a product with a three-dimensional structure may be formed by printing layer by layer.

However, the 3D printer using a liquid crystal screen as a projection device has a large power consumption, and it becomes a technical problem to be solved in the field to reduce the power consumption of the 3D printer.

SUMMARY

Accordingly, it is an object of the present disclosure to provide a projection device for a 3D printer and a 3D printer comprising the projection device, such that the 3D printer has a low power consumption.

To achieve the above-mentioned objection, according to an aspect of the present disclosure, there is provided a projection device for a 3D printer, comprising a light source and a display panel for displaying an image to be printed, the image to be printed comprising a light transmission region and a light shielding region, wherein the projection device is configured such that lights emitted from the light source pass through the light transmission region, and that the lights passing through the light transmission region from the light source are non-polarized lights.

Optionally, the display panel is divided into a plurality of pixel units, each of which is provided with a first electrode and a second electrode, and an electrochromic material is interposed between the first electrode and the second electrode, the electrochromic material becomes black to form the light shielding region when an electric field is formed between the first electrode and the second electrode, and the electrochromic material becomes transparent to form the light transmission region when no electric field is formed between the first electrode and the second electrode.

Optionally, the display panel is divided into a plurality of pixel units, each of which is bounded by four side walls as well as a top wall and a bottom wall located at upper and lower ends of four side walls, the top wall and the bottom wall being formed of a transparent material, and the pixel unit is provided with a solvent and a plurality of electrophoretic particles disposed in the solvent, and the projection device is configured such that an electric field is formed within the pixel unit to control the plurality of electrophoretic particles to cover the top wall or the side walls, to form the light shading region or the light transmission region.

Optionally, two side electrodes are respectively provided on two opposite side walls of the pixel unit, and a pixel electrode is provided on the bottom wall of the pixel unit, the side electrodes and the pixel electrode being insulated from each other.

Optionally, the pixel unit further includes a top electrode disposed on the top wall and insulated from the side electrodes.

Optionally, a second insulation strip is formed on each side electrode so that the side electrode is insulated from the top electrode.

Optionally, the pixel unit comprises two first insulation strips provided on the pixel electrode, the two first insulation strips are provided at both sides of the pixel electrode respectively, and the two side electrodes are provided on the two first insulation strips respectively, and the side electrode and the first insulation strip connected thereto form a part of the side wall.

Optionally, the projection device comprises a first substrate and a second substrate opposite to the first substrate, and the side wall is formed on the first substrate, and the bottom wall forms a part of the first substrate, and the top wall forms as a part of the second substrate.

Optionally, the second substrate comprises a second back substrate and a black matrix provided on the second back substrate, the black matrix comprising lateral edges and longitudinal edges which are arranged across to each other, the lateral edges covering the side wall in the pixel unit extending laterally, and the longitudinal edges covering the side wall in the pixel unit extending longitudinally.

Optionally, the second substrate further comprises a second planarization layer covering the black matrix, and a top electrode is disposed on the second planarization layer.

Optionally, the first substrate comprises a first back substrate, a plurality of data lines provided on the first back substrate, a plurality of groups of gate lines provided on the first back substrate, and a plurality of groups of thin film transistors provided on the first back substrate; each group of thin film transistors comprises a first thin film transistor and a second thin film transistor, each group of gate lines comprises a first gate line and a second gate line, each column of pixel units corresponds to one of data lines, each row of pixel units corresponds to one group of gate lines, each of pixel units corresponds to one group of the thin film transistors; a gate electrode of the first thin film transistor is connected with the first gate line, a source electrode of the first thin film transistor is connected with the data line, a drain electrode of the first thin film transistor is connected with one side electrode and a first predetermined electrical level input terminal is connected with the other side electrode; a gate electrode of the second thin film transistor is connected with the second gate line, a source electrode of the second thin film transistor is connected with the data line, and a drain electrode of the second thin film transistor is connected with the pixel electrode.

Optionally, the display panel further comprises a top electrode formed on the second substrate, the top electrode being connected with a second predetermined electrical level input terminal such that the top electrode forms a capacitor with the pixel electrode.

Optionally, the first substrate further comprises a plurality of common electrodes, each of pixel units is provided with one common electrode, and said common electrode forms a storage capacitor with the pixel electrode.

Optionally, the common electrode is arranged in a same layer with the group of gate lines.

Optionally, the first predetermined electrical level input terminal is formed integrally with the second predetermined electrical level input terminal so that a first predetermined electrical level is the same as a second predetermined electrical level; the group of gate lines further comprises a third gate line and a fourth gate line, and the display panel further comprises a common signal line and a common signal lead, the group of thin film transistors further comprises a third thin film transistor and a fourth thin film transistor; a gate electrode of the third thin film transistor is connected with the third gate line, a first electrode of the third thin film transistor is connected with one of the side electrodes which is not connected with the first thin film transistor, and a second electrode of the third thin film transistor is connected with an output terminal of the common electrode; a gate electrode of the fourth thin film transistor is connected with the fourth gate line, and a first electrode of the fourth thin film transistor is connected with the other output terminal of the common electrode, and a second electrode of the fourth thin film transistor is connected with the top electrode; the output terminal of the common electrode is connected with the common signal lead, the common signal lead is connected with the common signal line, and the common signal line is connected with the first predetermined electrical level input terminal.

Optionally, a first planarization layer is formed above the group of thin film transistors, and the pixel electrode is provided on the first planarization layer, and the side wall is provided above the pixel electrode.

Optionally, the adjacent side walls of two adjacent pixel units are formed integrally, and an insulating projection for insulating the pixel electrodes of the two adjacent pixel units from each other is formed on a bottom end of the side walls which are formed integrally.

Optionally, a ratio of a density of the electrophoretic particles to a density of the solvent is 0.75 to 1.05.

According to another aspect of the present disclosure, there is provided a 3D printer comprising the projection device according to the present disclosure.

In the projection device according to the present disclosure, lights emitted from the light source have a very small loss after passing through the light transmission region of the display panel, and the lights still have a substantial intensity after reaching the transparent reservoir. In the projection device according to the present disclosure, the light source with a relatively low power may emit a light intensity which is required for the photopolymerizable material to polymerize, therefore, the projection device according to the present disclosure has low power consumption and thus the power consumption of the printer including the projection device is reduced as a whole.

BRIEF DESCRIPTION OF THE DRAWINGS

The accompanying drawings are intended to provide a further understanding of the disclosure and are intended to constitute a part of the specification which, together with the following detailed description, serve to explain the disclosure but is not to be construed as limiting the disclosure. In the drawings.

DETAILED DESCRIPTION OF PREFERRED EMBODIMENTS

Hereinafter, specific embodiments of the present disclosure will be described in detail with reference to the accompanying drawings. It is to be understood that the specific embodiments described herein are for the purpose of illustration and explanation only and are not intended to limit the disclosure.

Figure 1:
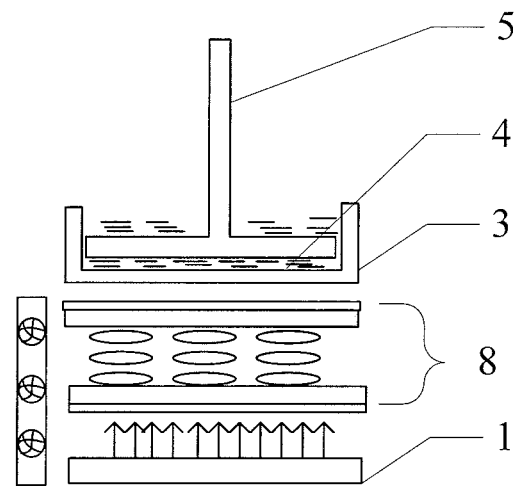
FIG. 1 is a schematic view of a structure of a 3D printer in the prior art.

Since the main component of the projection device in the prior art shown in FIG. 1 is a liquid crystal screen 8, the 3D printer shown in FIG. 1 has a substantially high power consumption. In order to achieve the display of the image, a first polarizer and a second polarizer are provided on a light entrance surface and a light exit surface of the liquid crystal screen 8, respectively. The lights emitted from the light source 1 are non-polarized lights, most of which are absorbed by the first polarizer after passing through the first polarizer and the second polarizer, only those of lights that are in a direction of polarization coinciding with the first polarizer can leave from the liquid crystal screen. In other words, a large portion of lights are lost after they are converted into polarized lights by the liquid crystal screen 8, thereby reducing the utilization of lights emitted by the light source 1 and increasing the power consumption.

Figure 2:
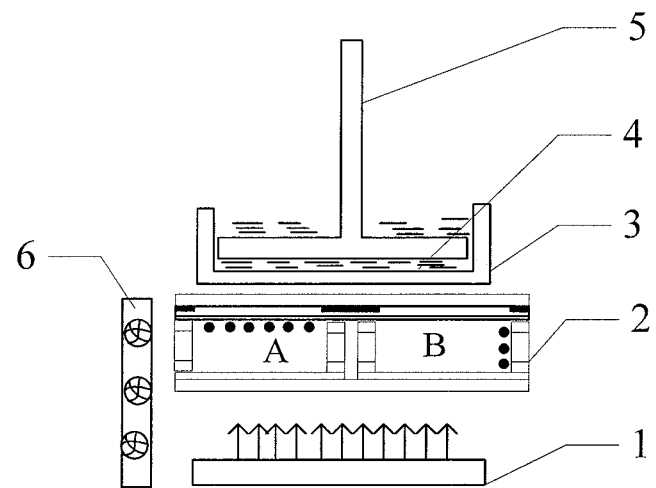
FIG. 2 is a schematic view of a structure of an optional embodiment of a 3D printer according to the present disclosure.

In order to reduce the power consumption of the 3D printer, as shown in FIG. 2, an embodiment of the present disclosure provides a projection device for a 3D printer, comprising a light source 1 and a display panel 2 for displaying an image to be printed. The image to be printed comprises a light transmission region and/or a light shielding region. Lights emitted from the light source 1 may pass through the light transmission region, and the lights emitted from the light source 1 are non-polarized lights after they pass through the light transmission region.

In the present disclosure, the display panel 2 is not provided with any polarizers and the lights emitted from the light source 1 are still non-polarized lights after they pass through the light transmission region. Therefore, compared with the prior art shown in FIG. 1, in the projection device according to the present disclosure, the lights emitted from the light source 1 have a very small loss after passing through the light transmission region of the display panel 2, and the lights still have a substantial intensity after reaching the transparent reservoir 3. In the projection device according to the present disclosure, the light source 1 with a relatively low power may emit a light intensity which is required for the photopolymerizable material 4 to polymerize, therefore, the projection device according to the present disclosure has low power consumption and thus the power consumption of the 3D printer including the projection device is reduced as a whole.

In the present disclosure, there is no limitation to the specific type of the display panel 2 as long as the display panel 2 does not comprise a polarizer and can display an image to be printed. For example, the display panel 2 may be an electrochromic display panel or an electrophoretic display panel. Of course, the present disclosure is not limited to these two types, and the display panel 2 may be other type of display panel which can achieve its light transmission region and light shading region according to those of the image to be printed under a voltage control without a process to the incident lights, which can ensure that the emergent lights are still non-polarized lights, to avoid a significant reduction in the power of the emergent lights, making the power consumption of the 3D printer reduced.

In the case where the display panel 2 is an electrochromic display panel, the display panel 2 is divided into a plurality of pixel units, each of which is provided with a first electrode and a second electrode, and an electrochromic material is interposed between the first electrode and the second electrode, the electrochromic material becomes black to form the light shielding region when an electric field is formed between the first electrode and the second electrode, and the electrochromic material becomes transparent to form the light transmission region when there is no electric field formed between the first electrode and the second electrode.

In order to control the electric field between the first electrode and the second electrode, the display panel may comprise a first substrate and a package substrate. The first substrate is provided on it with gate lines and data lines which are arranged across to each other, so that the first substrate is divided into a plurality of the pixel units. A thin film transistor can be arranged in each of pixel units, a gate electrode of the thin film transistor is connected with the gate line in a same row. A source electrode of the thin film transistor is connected with the data line in a same column. A drain electrode of the thin film transistor is connected with the first electrode provided on the first substrate. The second electrode is provided on the package substrate, and the electrochromic material is filled between the first substrate and the package substrate. Controlling the electrochromic display panel so as to display image is well known in the art and will not be described here.

The display panel 2 shown in FIG. 2 is an electrophoretic display panel. For ease of observation, only two pixel units, i.e., pixel unit A and pixel unit B, are shown in a magnification manner in the display panel 2 in FIG. 2. When the pixel unit A is in the light shielding state, the pixel unit B is in the light transmission state. Specifically, as shown, the display panel 2 is divided into a plurality of pixel units, each of the pixel units is bounded by four side walls as well as a top wall and a bottom wall located at upper and lower ends of four side walls, the top wall and the bottom wall being formed of a transparent material, and the pixel unit is provided with a solvent and a plurality of electrophoretic particles in the solvent, an electric field may be formed within the pixel unit to control the plurality of electrophoretic particles to cover the top wall or the side wall. In the present embodiment, the pixel units are sealed, and as the pixel unit A in FIG. 2 shows, the pixel units are in the light shielding state when the electrophoretic particles cover the top wall; as the pixel unit B in FIG. 2 shows, the pixel units are in the light transmission state when the electrophoretic particles cover the side wall. The position of the electrophoretic particles can be changed by changing the direction of the electric field formed in the pixel units.

In the present disclosure, the electrophoretic particles are opaque and the used electrophoretic particles may be carbon black pellets or latex pellets having a core-shell structure with residual double bonds, or the electrophoretic particles may be a mixture of two above-mentioned kinds of pellets.

In case that the electrophoretic particles are latex pellets, the shells of the latex pellets may be generally made of polymethacrylic acid or polymethyl methacrylate, or the material of the shells of the latex pellets may also be methacrylic acid, or copolymers of methyl methacrylate and styrene. The residual double bonds on the latex pellet core react with the metal oxide such as osmium teoxide, resulting in a strong light absorbance, so that the latex pellet presents black color. In the present disclosure, the particle size of the electrophoretic particles is generally between 10-100 nm. The ratio of the density of the electrophoretic particles to the density of the solvent is between 0.75 and 1.05. That is, the density of the electrophoretic particles is very close to that of the solvent, and it is advantageous that the electrophoretic particles have a same density as that of the solvent so that the electrophoretic particles can be kept in its place according to the mechanical principle (the gravity and the buoyancy of the electrophoretic particles are approximately equal) even if the electric field in the pixel units is removed, which can reduce energy consumption.

In the present disclosure, the type of the solvent is not specifically limited, as long as the solvent has a high stability, a good insulation, as well as a good optical and electrochemical stability. As a specific embodiment of the present disclosure, the solvent may be a mixture of one or more of an epoxide, an aromatic hydrocarbon, a halogenated hydrocarbon, an aliphatic hydrocarbon and a siloxane. Since tetrachlorethylene has a series of advantages such as a low dielectric constant, a high boiling point, a high density, a high refractive index and a low viscosity, it is advantageous that the solvent is tetrachlorethylene.

In the present disclosure, the specific way in which an electric field is formed in the pixel units is not particularly limited. For example, as a specific embodiment of the present disclosure, side electrodes are respectively provided on both opposing side walls of the pixel units, and a pixel electrode is provided on the top wall of the pixel units. The pixel electrode and the side electrodes are insulated from each other.

Figure 3:
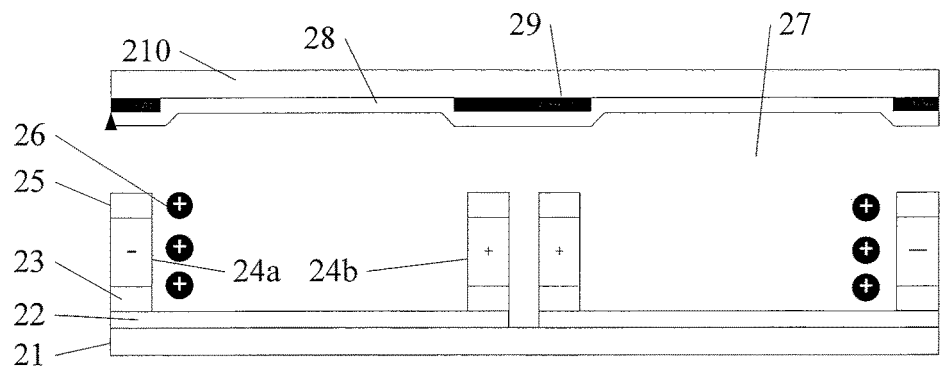
FIG. 3 is a schematic view showing that the pixel units are in a transparent state in a projection device of the 3D printer shown in FIG. 2, wherein the second substrate is not provided with a second planarization layer.

It is to be noted that the two side electrodes are controlled independently from each other, and the pixel electrode and the side electrodes are also controlled independently from each other. For example, if it is desirable to generate a horizontal electric field in the pixel units such that the electrophoretic particles cover the sidewall, then a high level is provided to one side electrode to form an anode and a low level is provided to the other side electrode to form a cathode so as to generate an electric field between the two side electrodes. As shown in FIG. 3, the electrophoretic particles move toward the cathode or anode under the action of the electric field. Whether the electrophoretic particles are specifically moved towards the cathode or the anode is dependent on the composition of the electrophoretic particles themselves. In the embodiment shown in FIG. 3, the electrophoretic particles move toward the cathode.

As described above, in order to make the electrophoretic particles cover the top wall of the pixel units, it is necessary to form a vertical electric field in the pixel units.

In the present disclosure, there is no limitation to the way in which a vertical electric field is formed. For example, a high level may be provided to the side electrode as an anode, a low level may be provided to the pixel electrode as a cathode, so that an electric field may be formed between the pixel electrodes and the side electrodes, which includes a horizontal electric field component and a vertical electric field component. The vertical electric field component can become larger than the horizontal electric field component by controlling the potential difference between the pixel electrodes and the side electrodes, thereby the electrophoretic particles can be controlled to move toward the top wall of the pixel units under the action of the vertical electric field component and cover the top wall.

In order to facilitate the control, as an optional embodiment of the present disclosure, the pixel unit may further include a top electrode disposed on the top wall and insulated from the pixel electrode, further the side electrodes and the top electrode are also insulated from each other. When it is required that the electrophoretic particles cover the top wall, different levels may be provided to the top electrode and the pixel electrode, respectively, and a vertical electric field is directly formed between the top electrode and the pixel electrode. At this time, the side electrodes are not energized.

Figure 4:
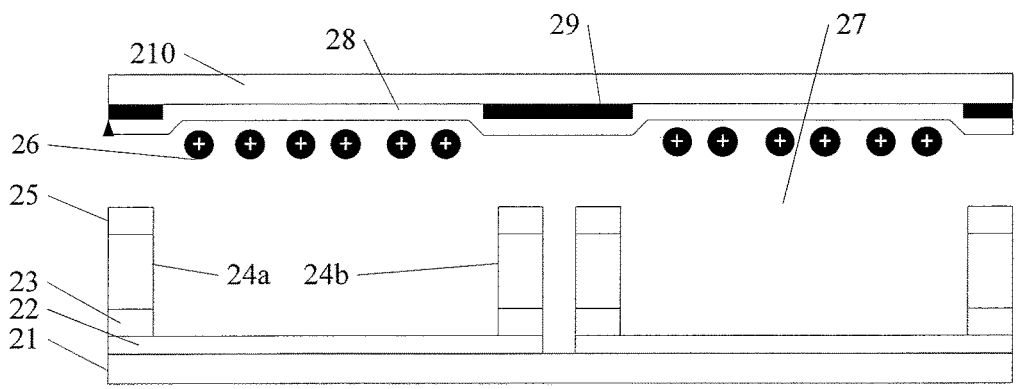
FIG. 4 is a schematic view showing that the pixel units are in a light shielding state in a projection device of the 3D printer shown in FIG. 2, wherein the second substrate is not provided with a second planarization layer.
Figure 5:
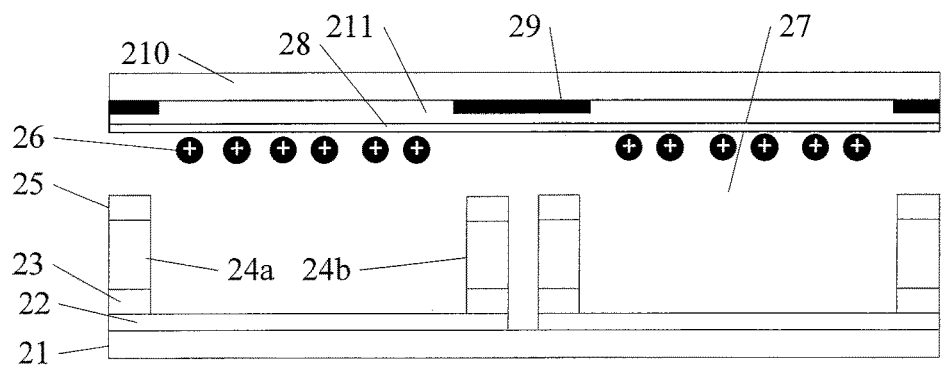
FIG. 5 is a schematic view showing that the pixel units are in a light shielding state in a projection device of the 3D printer shown in FIG. 2, wherein the second substrate is provided with a second planarization layer.

In order to achieve an insulation between the side electrode and the top electrode, it is optional that a second insulation strip is formed between the side electrode and the top electrode. As shown in FIGS. 3 to 5, second insulation strips 25 are provided on the top surface of the side electrodes (including the side electrode 24a and the side electrode 24b).

In the present disclosure, there is no limitation to the specific structure of the side wall in the pixel units. As an embodiment of the present disclosure, as shown in FIGS. 3 to 5, the pixel unit includes two first insulation strips 23 provided on the pixel electrode 22 which are respectively positioned at both sides of the pixel electrode 22, the side electrode 24a and the side electrode 24b are provided on the two first insulation strips 23, respectively, and the side electrode and the first insulation strip 23 connected with the side electrode form a part of the side wall. For example, the side electrode 24a and the first insulation strip 23 on the left are formed as a part of the left side wall of the pixel unit, while the side electrode 24b and the first insulation strip on the right are formed as a part of the right side wall of the pixel unit. In the present disclosure, there is no limitation to the structure of the other two side walls as long as the four side walls as well as the top wall and the bottom wall are capable of forming a cavity 27 for accommodating the solvent and the electrophoretic particles 26. For example, the other two side walls may be insulation plates.

Since the size of each pixel unit is very small, the projection device may include a first substrate and a second substrate disposed opposite to each other, so as to to facilitate the manufacture, as shown in FIGS. 3 to 5. The side wall is formed on the first substrate. The bottom wall is formed as a part of the first substrate, and the top wall is formed as a part of the second substrate.

As shown in FIGS. 3 and 5, the pixel electrodes 22 are formed on the first substrate, and the top electrode 28 is formed on the second substrate. The top electrode 28 may be formed as a surface electrode as a whole covering the second substrate. The pixel electrode 22 is a block electrode, and one pixel electrode 22 is provided in each pixel unit. It is to be understood that both the top electrode 28 and the pixel electrode 22 are made of a transparent electrode material. The transparent electrode material may be ITO, IZO, ATO or the like. These transparent electrode materials have a relatively high UV transmittance.

In the present disclosure, there is no limitation to the specific structure of the second substrate as long as it can be used as the top wall of each pixel unit and the top electrode 28 can be provided thereon. As a specific embodiment of the present disclosure, as shown in FIGS. 3 and 4, the second substrate may include a second back substrate 210 and a black matrix 29 provided on the second back substrate 210. The second back substrate 210 is transparent. The light rays can pass through the second back substrate 210 when it is not covered with electrophoretic particles. The black matrix 29 includes lateral and longitudinal edges arranged across to each other. The lateral edges cover side walls in the pixel unit extending laterally, while the longitudinal edges cover the side walls in the pixel unit extending longitudinally. In other words, the black matrix 29 is a grid-like structure, and each grid corresponds to one pixel unit. In the present disclosure, the face that the black matrix 29 is provided on the second back substrate 210 can enhance the display performance of the display panel.

Further, as shown in FIG. 5, a second planarization layer 211 covering the black matrix 29 may be provided on the second back substrate 210, and the top electrode 28 is formed on the second planarization layer 211. The surface of the second planarization layer 211 facing to the top electrode 28 is planar, so the surface of the top electrode 28 is also planar, such that the electrophoretic particles 26 can be uniformly distributed on the top wall to prevent generation of light leakage when a vertical electric field is formed in the pixel units. It is to be noted that the second planarization layer 211 is made of a transparent material. For example, the second planarization layer 211 may be made of a transparent resin material.

In the present disclosure, there is no limitation to the specific structure of the first substrate as long as the side electrode and the pixel electrode 22 can be powered in a predetermined order. An embodiment of the first substrate will be described below with reference to the accompanying drawings.

Figure 6:
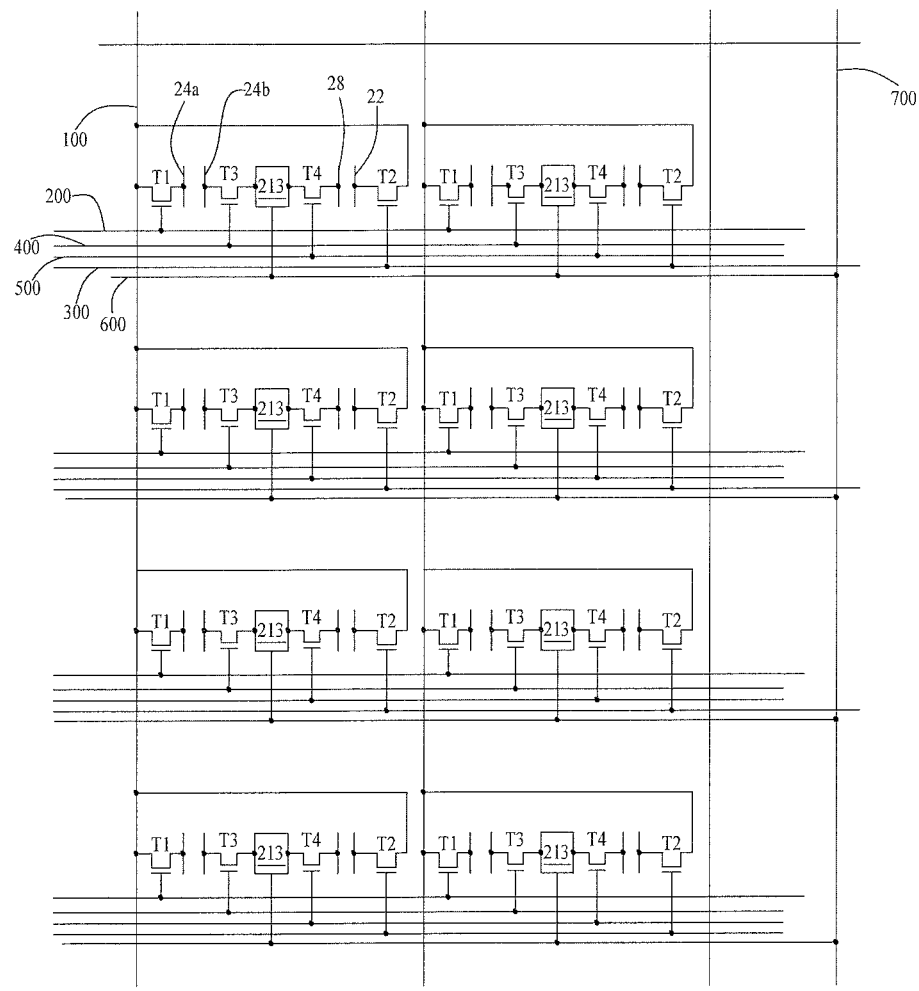
FIG. 6 is a schematic view of a circuit diagram of a first substrate.
Figure 7:
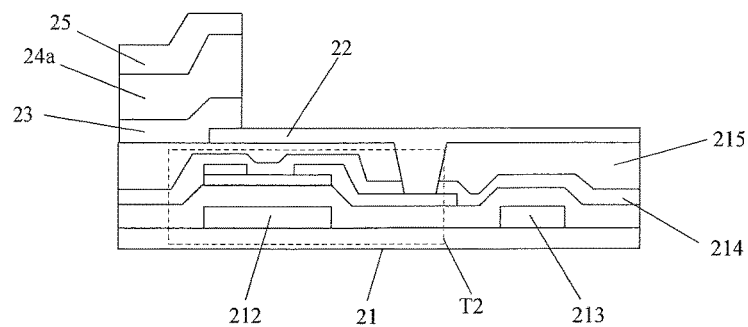
FIG. 7 is a schematic view of an embodiment of a first substrate in a projection device of the 3D printer shown in FIG. 2, in which a portion of a side wall is located on a pixel electrode and a portion of the side wall is on a first planarization layer.
Figure 8:
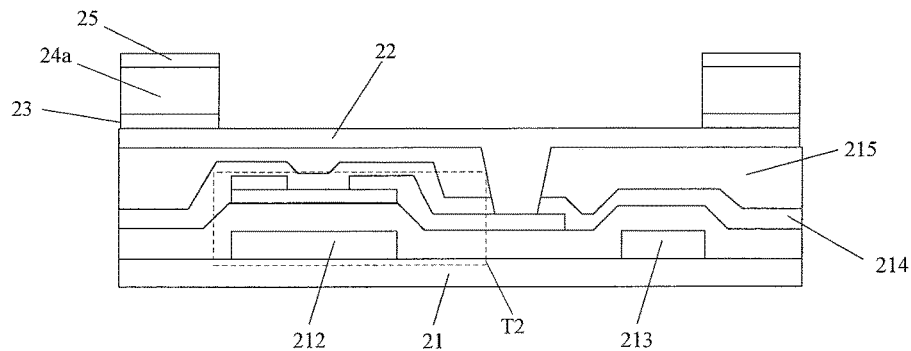
FIG. 8 is a schematic view of another embodiment of a first substrate in a projection device of the 3D printer shown in FIG. 2, in which the side wall is completely located on the pixel electrode.
Figure 9:
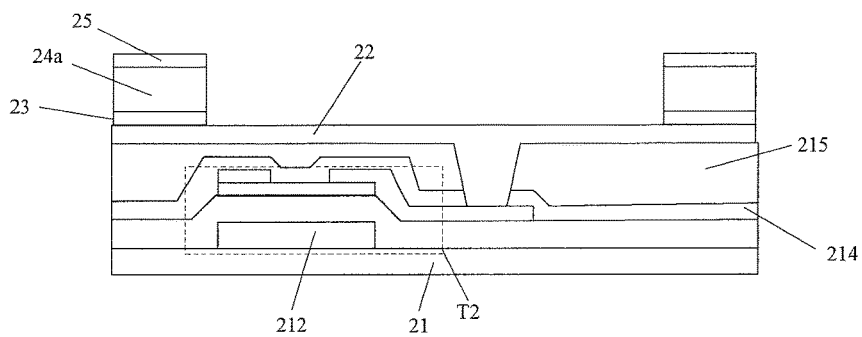
FIG. 9 is a schematic view of a further embodiment of a first substrate in a projection device of the 3D printer shown in FIG. 2, in which there are no common electrodes.

As shown in FIGS. 7 to 9, the first substrate comprises a first back substrate 21. FIG. 6 shows a circuit diagram on the first substrate. As shown in FIG. 6, the first substrate further comprises a plurality of data lines 100 provided on the first back substrate (not shown in FIG. 6), a plurality of groups of gate lines provided on the first back substrate and a plurality of groups of thin film transistors provided on the first back substrate. Each group of the thin film transistors includes a first thin film transistor T1 and a second thin film transistor T2, each group of gate lines comprises a first gate line 200 and a second gate line 300. Each column of pixel units correspond to a data line 100, each row of pixel units correspond to one group of the gate lines, and each of pixel units corresponds to one group of the thin film transistors. The gate electrode of the first thin film transistor T1 is connected with the first gate line 200, and the source electrode of the first thin film transistor T1 is connected with the data line 100, and the drain electrode of the first thin film transistor T1 is connected with one side electrode (the side electrode 24a in the embodiment shown in FIG. 6), and the other side electrode (the side electrode 24b in the embodiment shown in FIG. 6) is connected with a first predetermined electrical level input terminal. The gate electrode of the second thin film transistor T2 is connected with the second gate line 300, the source electrode of the second thin film transistor T2 is connected with the data line 100, and the drain electrode of the second thin film transistor T2 is connected with the pixel electrode 22.

When a display is performed, the groups of gate lines are scanned row by row. The first gate line 200 and the second gate line 300 are scanned at different times.

When the first gate line 200 is scanned, the first thin film transistor T1 is energized and a data voltage is supplied to the side electrode 24a connected with the drain electrode of the first thin film transistor T1 through the data line 100, so that a horizontal electric field is formed between the side electrode 24a and the side electrode 24b.

When the second gate line 300 is scanned, the second thin film transistor T2 is energized and a data voltage is supplied to the pixel electrode 22 connected with the drain electrode of the second thin film transistor T2 through the data line 100, so that a vertical electric field is formed between the pixel electrode 22 and the top electrode 28.

As described above, the display panel further comprises a top electrode. As a specific embodiment of the present disclosure, the top electrode is formed on the second substrate. The top electrode is connected with a second predetermined electrical level input terminal so that the top electrode may form a capacitor with the pixel electrode.

In the present disclosure, the first predetermined electrical level provided by the first predetermined electrical level input terminal for the side electrode 24b may be identical to the second predetermined electrical level provided by the second predetermined electrical level input terminal for the top electrode 28.

As described above, when an image is displayed on the display panel 2, the groups of gate lines are scanned row by row, the scanning duration is relatively short, and after the scanning is completed, there is no scanning signal on the group of gate lines before the next scanning cycle. In order to keep the electrophoretic particles in the pixel unit in its state, it is optional that, as shown in FIGS. 7 and 8, the first substrate may further include a plurality of common electrodes 213, each of pixel units is provided with one common electrode 213 capable of forming a storage capacitor with the pixel electrode 22. The common electrode 213 is connected with a predetermined electrical level input terminal, and after the scanning to the row of groups of gate lines is completed, a storage capacitor is formed between the common electrode 213 and the pixel electrode 22, and the state of the electrophoretic particles can be maintained.

The common electrode 213 is arranged in a same layer with the group of gate lines so as to facilitate the arrangement. As shown in FIGS. 7 and 8, the gate electrode 212 in the group of thin film transistors is arranged in a same layer with the common electrode 213.

In the embodiment of the present disclosure, the first predetermined electrical level may be supplied to the side electrode 24b by the common electrode 213, and the second predetermined electrical level may be supplied to the top electrode 28 by the common electrode 213. Under this situation, the first predetermined electrical level input terminal and the second predetermined electrical level input terminal may be formed integrally so that the first predetermined electrical level is equal to the second predetermined electrical level, and the common electrode and the first predetermined electrical level input terminal are connected with each other.

In order to achieve the above object, alternatively, as shown in FIG. 6, the group of gate lines further includes a third gate line 400 and a fourth gate line 500, and the display panel further includes a common signal line 700 and a common signal lead 600. The group of thin film transistors further includes a third thin film transistor T3 and a fourth thin film transistor T4. The gate electrode of the third thin film transistor T3 is connected with the third gate line 400, and the first electrode of the third thin film transistor T3 is connected with one of the side electrodes which is not connected with the first thin film transistor T1 (i.e., the side electrode 24b in FIG. 6). The second electrode of the third thin film transistor T3 is connected with one of output terminals of the common electrode 213. The gate electrode of the fourth thin film transistor T4 is connected with the fourth gate line 500, and the first electrode of the fourth thin film transistor T4 is connected with the other output terminal of the common electrode 213. The second electrode of the fourth thin film transistor T4 is connected with the top electrode 28, and the input terminal of the common electrode 213 is connected with the common signal lead 600. The common signal lead 600 is connected with the common signal line 700, and the common signal line 700 is connected with the first predetermined electrical level input terminal.

When the electrophoretic particles are required to cover the top wall of the pixel unit, a signal is provided to the fourth gate line 500 to energize the fourth thin film transistor T4, so that the second predetermined electrical level on the common electrode 213 is conducted to the top electrode 28. At this time, there is no signal on the third gate line 400, and the third thin film transistor T3 isnot energized. Similarly, when the electrophoretic particles are required to cover the sidewalls of the pixel units, a signal is provided to the third gate line 400 to energize the third thin film transistor T3 without providing a signal to the fourth gate line 500 to energize the fourth thin film transistor T4.

In the present disclosure, the third gate line 400 and the fourth gate line 500 may be provided in a same layer with the first gate line 200 and the second gate line 300. Likewise, the common signal lead 600 may be provided in a same layer with the gate line. It is clear that the first thin film transistor T1, the second thin film transistor T2, the third thin film transistor T3, and the fourth thin film transistor T4 may be formed at the same time. The drain electrodes of the four thin film transistors are connected with corresponding electrodes through different via holes, respectively.

Of course, in the present disclosure, it is also possible that the common electrode is not provided. As shown in FIG. 9, the common electrode is not provided. After a scanning to the group of gate lines is completed, the pixel electrode 22 forms a storage capacitor with the side electrode 24b connected with the first predetermined electrical level input terminal to maintain the state of the electrophoretic particles.

In the present disclosure, the first substrate includes a plurality of different layers, each of which is provided with a different pattern, thereby forming the group of gate lines, the data lines, and the group of thin film transistors. As an optional embodiment of the present disclosure, as shown in FIG. 8, a first planarization layer 215 is formed above the group of thin film transistors, and pixel electrodes 22 are provided on the first planarization layer 215, the side walls are disposed above the pixel electrodes 22. In the pixel units, the side electrodes which are not connected with the drain electrodes of the first thin film transistor are electrically connected with the common electrode through a via hole passing through the first planarization layer, and the common electrode is connected with the first predetermined electrical level input terminal. The side electrodes which are not connected with the drain electrodes of the first thin film transistor are connected with the first predetermined electrical level input terminal through a common electrode.

In the present disclosure, there is no strict requirement to the positional relationship between the side wall and the pixel electrode 22 in each pixel unit. For example, in the embodiment shown in FIG. 7, a part of the side wall is located on the pixel electrode 22 and the other part is located on the first planarization layer 215. In the embodiment shown in FIG. 8, the side wall is completely located on the pixel electrode 22.

In addition to providing the first planarization layer 215, the first substrate may further include a passivation layer 214 disposed between the first planarization layer 215 and the upper surface of the group of thin film transistors. The passivation layer 214 may be made of silicon oxide or silicon nitride, thereby preventing moisture from entering the group thin film transistors.

Figure 10:
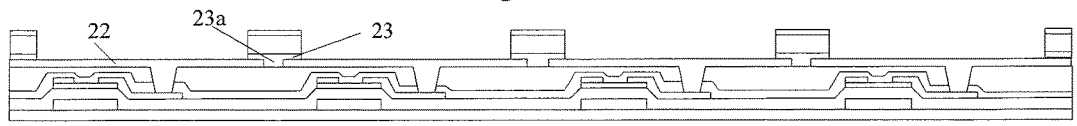
FIG. 10 is a schematic view of a portion of a first substrate in a projection device of the 3D printer shown in FIG. 2.

In order to facilitate manufacturing and simplifying the structure of the first substrate, optionally, as shown in FIG. 10, the adjacent side walls of the two adjacent pixel units are formed integrally, and it is formed at the bottom of the integral side wall an insulating projection 23a for insulating the pixel electrodes of two adjacent pixel units from each other.

It is to be understood that the projection device may further include a light source 1 provided at the side of the display panel 2 which can emit ultraviolet light having a wavelength of 250 nm or more.

As another aspect of the present disclosure, there is provided a 3D printer, which, as shown in FIG. 2, comprises the projection device according to the embodiments of the present disclosure.

Since the display panel 2 in the projection device according to the embodiment of the present disclosure does not convert the ultraviolet light passing therethrough into polarized light, the intensity loss is small when the ultraviolet light passes through the display panel 2. Therefore, a light source 1 with a small power may emit ultraviolet light which has an intensity sufficient to polymerize the photopolymerizable material. It can be seen that the 3D printer according to the embodiment of the present disclosure has a small power consumption and is more energy-saving and environmentally friendly.

Accordingly, the 3D printer according to the embodiment of the present disclosure further includes a transparent reservoir 3 located on the light exit side of the display panel 2, a photopolymerizable material 4 contained in the transparent reservoir 3, and a lifting bar-pallet 5.

The ultraviolet light emitted from the light source 1 passes through the light transmission region in the image displayed on the display panel 2 to the transparent reservoir 3, and the photopolymerizable material 4 is cured on the lifting bar-pallet 5 under the irradiation of ultraviolet light.

In order to ensure the safe operation of the 3D printer, the 3D printer may optionally include a cooling device 6. The cooling device 6 is provided on the side of the 3D printer to cool the various components in the 3D printer, for example, the projection device.

It is to be understood that the above embodiments are merely illustrative embodiments for the purpose of illustrating the principles of the disclosure, but the disclosure is not limited thereto. It will be apparent to those skilled in the art that various changes and modifications can be made therein without departing from the spirit and substance of the disclosure, which are also considered to be within the scope of the present disclosure.

What is claimed is:

1. A projection device for a 3D printer, comprising a light source and a display panel for displaying an image to be printed, the image to be printed comprising a light transmission region and a light shielding region, wherein the projection device is configured such that lights emitted from the light source pass through the light transmission region, and that the lights passing through the light transmission region from the light source are non-polarized lights, wherein the display panel is divided into a plurality of pixel units, each of which is bounded by four side walls as well as a top wall and a bottom wall located at upper and lower ends of four side walls, the top wall and the bottom wall being formed of a transparent material, and the pixel unit is provided with a solvent and a plurality of electrophoretic particles disposed in the solvent, and the projection device is configured such that an electric field is formed within the pixel unit to control the plurality of electrophoretic particles to cover the top wall or the side walls, to form the light shading region or the light transmission region, wherein two side electrodes are respectively provided on two opposite side walls of the pixel unit, and a pixel electrode is provided on the bottom wall of the pixel unit, the side electrodes and the pixel electrode being insulated from each other, the projection device comprises a first substrate and a second substrate opposite to the first substrate, and the side wall is formed on the first substrate, and the bottom wall forms a part of the first substrate, and the top wall forms as a part of the second substrate, and the first substrate comprises a first back substrate, a plurality of data lines provided on the first back substrate, a plurality of groups of gate lines provided on the first back substrate, and a plurality of groups of thin film transistors provided on the first back substrate; each group of thin film transistors comprises a first thin film transistor and a second thin film transistor, each group of gate lines comprises a first gate line and a second gate line, each column of pixel units corresponds to one of data lines, each row of pixel units corresponds to one group of gate lines, each of pixel units corresponds to one group of the thin film transistors; a gate electrode of the first thin film transistor is connected with the first gate line, a source electrode of the first thin film transistor is connected with the data line, a drain electrode of the first thin film transistor is connected with one side electrode and a first predetermined electrical level input terminal is connected with the other side electrode; a gate electrode of the second thin film transistor is connected with the second gate line, a source electrode of the second thin film transistor is connected with the data line, and a drain electrode of the second thin film transistor is connected with the pixel electrode.

2. The projection device according to claim 1, wherein the display panel is divided into a plurality of pixel units, each of which is provided with a first electrode and a second electrode, and an electrochromic material is interposed between the first electrode and the second electrode, the electrochromic material becomes black to form the light shielding region when an electric field is formed between the first electrode and the second electrode, and the electrochromic material becomes transparent to form the light transmission region when no electric field is formed between the first electrode and the second electrode.

3. The projection device according to claim 1, wherein the pixel unit further includes a top electrode disposed on the top wall and insulated from the side electrodes.

4. The projection device according to claim 3, wherein a second insulation strip is formed on each side electrode so that the side electrode is insulated from the top electrode.

5. The projection device according to claim 1, wherein the pixel unit comprises two first insulation strips provided on the pixel electrode, the two first insulation strips are provided at both sides of the pixel electrode respectively, and the two side electrodes are provided on the two first insulation strips respectively, and the side electrode and the first insulation strip connected thereto form a part of the side wall.

6. The projection device according to claim 1, wherein the second substrate comprises a second back substrate and a black matrix provided on the second back substrate, the black matrix comprising lateral edges and longitudinal edges which are arranged across to each other, the lateral edges covering the side wall in the pixel unit extending laterally, and the longitudinal edges covering the side wall in the pixel unit extending longitudinally.

7. The projection device according to claim 6, wherein the second substrate further comprises a second planarization layer covering the black matrix, and a top electrode is disposed on the second planarization layer.

8. The projection device according to claim 1, wherein the display panel further comprises a top electrode formed on the second substrate, the top electrode being connected with a second predetermined electrical level input terminal such that the top electrode forms a capacitor with the pixel electrode.

9. The projection device according to claim 8, wherein the first substrate further comprises a plurality of common electrodes, each of pixel units is provided with one common electrode, and said common electrode forms a storage capacitor with the pixel electrode.

10. The projection device according to claim 9, wherein the common electrode is arranged in a same layer with the group of gate lines.

11. The projection device according to claim 9, wherein the first predetermined electrical level input terminal is formed integrally with the second predetermined electrical level input terminal so that a first predetermined electrical level is the same as a second predetermined electrical level; the group of gate lines further comprises a third gate line and a fourth gate line, and the display panel further comprises a common signal line and a common signal lead, the group of thin film transistors further comprises a third thin film transistor and a fourth thin film transistor; a gate electrode of the third thin film transistor is connected with the third gate line, a first electrode of the third thin film transistor is connected with one of the side electrodes which is not connected with the first thin film transistor, and a second electrode of the third thin film transistor is connected with an output terminal of the common electrode; a gate electrode of the fourth thin film transistor is connected with the fourth gate line, and a first electrode of the fourth thin film transistor is connected with the other output terminal of the common electrode, and a second electrode of the fourth thin film transistor is connected with the top electrode; the output terminal of the common electrode is connected with the common signal lead, the common signal lead is connected with the common signal line, and the common signal line is connected with the first predetermined electrical level input terminal.

12. The projection device according to claim 11, wherein a first planarization layer is formed above the group of thin film transistors, and the pixel electrode is provided on the first planarization layer, and the side wall is provided above the pixel electrode.

13. The projection device according to claim 1, wherein the adjacent side walls of two adjacent pixel units are formed integrally, and an insulating projection for insulating the pixel electrodes of the two adjacent pixel units from each other is formed on a bottom end of the side walls which are formed integrally.

14. The projection device according to claim 1, wherein a ratio of a density of the electrophoretic particles to a density of the solvent is 0.75 to 1.05.

15. A 3D printer comprising the projection device according to claim 1.

* * * * *